April 27, 1926.

P. J. RASMUSSEN

CULTIVATOR

Filed July 20, 1925

1,582,082

Inventor
Peter J. Rasmussen

By Herbert E. Smith
Attorney

Patented Apr. 27, 1926.

1,582,082

UNITED STATES PATENT OFFICE.

PETER J. RASMUSSEN, OF SPOKANE, WASHINGTON.

CULTIVATOR.

Application filed July 20, 1925. Serial No. 44,699.

*To all whom it may concern:*

Be it known that I, PETER J. RASMUSSEN, a citizen of Denmark, residing at Spokane, in Spokane County and State of Washington, have invented certain new and useful Improvements in Cultivators, of which the following is a specification.

My present invention relates to improvements in cultivators involving that type of implement which is especially adapted for use as a sub-soil weeder and in addition for performing the function of mulching the soil for proper retention of moisture in its cultivation.

The implement is of the combined wheel and drag type with suitable draft power applied thereto, and contemplates the use preferably, of a plurality of transversely disposed cutting blades which are flexibly suspended from the main frame of the implement with means for vertically adjusting the cutting blades with relation to the surface of the ground. Other meritorious features are incorporated in the implement for improving this type of cultivator as will be hereinafter more fully pointed out and claimed.

The invention consists in certain novel combinations and arrangements of parts as illustrated in the accompanying drawings wherein I have shown one complete example of the physical embodiment of my invention constructed according to the best mode I have thus far devised for the practical application of the principles of my invention.

Figure 1:
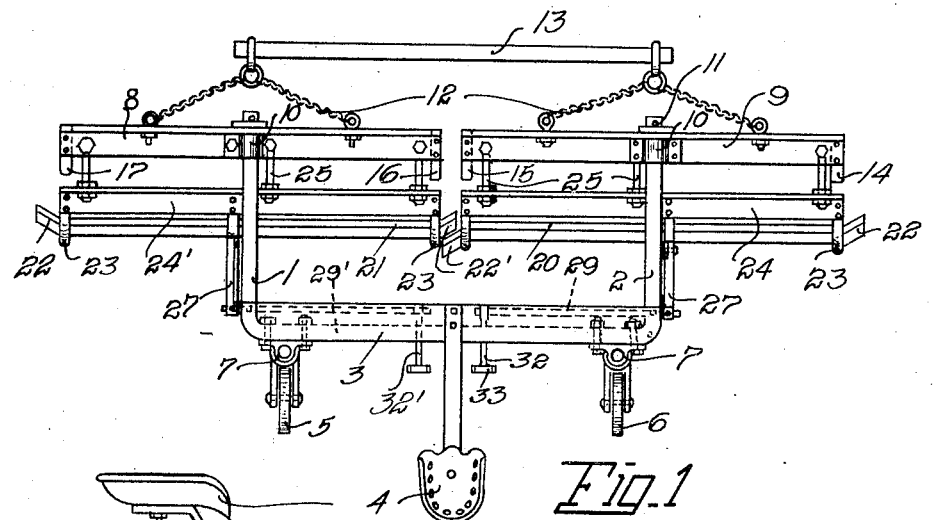
Figure 1 is a top plan view of an implement embodying my invention.

In carrying out my invention I utilize a comparatively light but strong main frame of U-shape and comprising a pair of longitudinally extending side bars 1 and 2, which are connected at the rear by a cross board 3 to which the driver's seat 4 is bolted in usual manner.

At the rear of the implement a pair of steering wheels 5 and 6 are swiveled to the main frame at 7, and at the front of the implement I utilize, preferably a pair of draw bars 8 and 9. These draw bars may be made up of angle irons and are disposed transversely of the implement in alinement and each bar is supported on one of the side bars of the implement, at its front end. At the center of each draw bar a supporting bracket or sleeve 10 is bolted to form a support by means of which a draw bar is suspended from a side bar. The vertical flanges of the draw bars are provided with openings through which the front ends of the side bars project, and cotter pins 11 are passed through perforations in the ends of the side bars for retaining the draw bars in position on the side bars. This arrangement it will be apparent insures a simple but effective construction for distributing the applied draft power with uniformity to the implement and permits of facile manipulation of the parts in assembling or dissociating the elements of the implement.

A pair of draft chains 12 are bolted in usual manner to the pair of draw bars and these draft chains are connected to a single tree or draft bar 13 to which the horses are hitched, or to which other power may be applied if desired.

Figure 2:
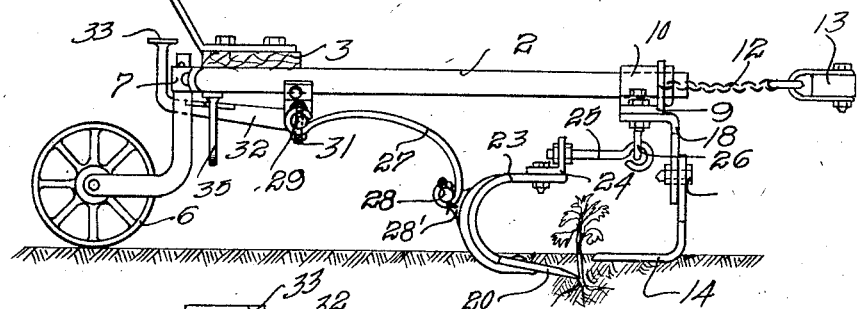
Figure 2 is a view in side elevation of the implement showing the cutting bars in operative position beneath the surface of the soil.
Figure 3:
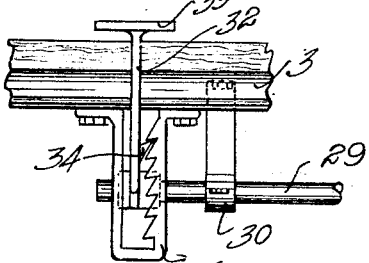
Figure 3 is an enlarged detail view showing one of the pedal devices used in adjusting the position of the weed cutters.

At the rear the implement is supported on the steering wheels 5 and 6, while at the front I provide adjustable drag shoes as 14, 15, 16, and 17. As best seen in Figure 2 these drag shoes are angular or L-shaped metal plates, one of which is carried at each end of the transversely disposed draw bars, with the horizontal flange of the plate adapted to drag over the surface of the ground. By means of these drag shoes the front portion of the implement is provided with a uniformly and widely distributed bearing or support in order that the implement may be maintained in proper position for accomplishing its purpose, and the rear wheels afford facile means for steering the implement.

These drag shoes are adjustable for the purpose of elevating or lowering the front portion of the implement with relation to the ground, and for this purpose angular brackets 18 are attached at the under side of the horizontal flanges of the draw bars. The vertical flanges of these brackets are slotted, and adjusting bolts 19 of the drag shoes are employed to affix the drag shoe in rigid adjusted position with relation to the brackets.

In carrying out my invention I preferably utilize two complementary cutting blades as 20 and 21, arranged in alinement transversely of the implement and adapted to pass through the soil just beneath its surface, for eliminating weeds as indicated in Figure 2 and for mulching the ground. These transversely disposed cutting blades are provided at their respective outer ends with forwardly turned or bent cutting portions 22 to prevent weeds from riding out over the edges of the cutting blades, and their inner ends which are bent and overlap at 22' at the longitudinal center of the implement also prevent the escape of weeds at this point, thus insuring a complete and wide cutting swath of the two cutters, as they pass through the sub-soil.

The pair of cutters is suspended by flexible supports just at the rear of the drag shoes which support the front portion of the implement, and each cutting bar has a plurality of hangers 23 attached thereto which curve upwardly and forwardly over the cutting blades as indicated in Figure 2. By means of the hangers the cutting blades are attached as by bolts to a pair of angle-iron suspending bars 24 and 24', which are alined and extend transversely of the implement below the main frame and slightly to the rear of the draw bars 8 and 9. The suspending bars, to which the cutters are rigidly attached, are flexibly suspended from the draw bars by means of suspending bolts 25 rigidly secured to the suspending bars, and eye-bolts 26 rigidly secured to the draw bars. The draft power is thus applied directly to the implement through the draw bars, and through the flexible bolt connection between the draw bars and suspending bars the pull is directly applied from the draw bars to the cutting bars, to insure an efficient and stabilized cutting movement of the cutters.

In addition to the adjustment secured for the front portion of the implement through the adjustable drag shoes, the cutting bars are also independently adjustable with relation to the ground surface. For this purpose each cutter is provided with a pair of lever arms as 27 preferably arched as shown and of resilient metal. Each lever arm is pivoted to a complementary cutter by means of a pivot pin as 28 passed through an opening in the front end of the lever arm and through a perforated ear 28' on the hanger 23, and cotter pins are employed as usual to retain the parts in operative position. Two rock shafts 29, 29', extending transversely of the implement and journaled in bearings 30 secured beneath the main frame are employed in the adjustment of the cutters. Each shaft is located at the rear of the lever arms, rigidly connected at its ends to the lever arms by means of bolts 31 passing through a transverse opening in the shaft and through the perforated ends of the lever arms. As the shaft is rocked it will be apparent that the arms are swung through an arc with the shaft as a pivot, and as the front ends of the arms are raised or lowered, the cutters are similarly adjusted. In addition to this adjustment for the cutters, these lever arms also perform the function of resilient supports for the cutters in connection with the flexible supports or suspending bolts 25 and 26, to absorb shocks or vibrations imparted to the cutters as they are performing their functions.

For rocking the shafts 29 29' each shaft is provided with a foot lever as 32 or 32' rigidly connected to the shaft and fashioned with a foot pedal as 33 in convenient position for access by the driver of the implement. The foot levers are retained in adjusted position by the engagement of a lug or rack tooth 34 on each lever with the selected tooth of a complementary rack-bracket 35 suspended beneath and attached to the main frame at the rear of the implement.

It will be apparent that the two cutters may be independently adjusted at various angles with relation to the soil, and to penetrate to various depths of the sub-soil for cultivation of the latter, which involves the removal of weeds and mulching of the ground, or soil. By means of the adjustable shoes the implement is also capable of adjustment to govern the cut of the cutting blades in the sub-soil, thus enhancing the value of the implement in the performance of its functions.

Having thus fully described my invention what I claim as new and desire to secure by Letters Patent is—

1. The combination with a U-shaped main frame and a pair of transversely arranged draw bars rigid therewith, of a plurality of adjustable drag shoes carried at the front of the main frame and a rear steering wheel for said implement, a pair of transversely arranged cutting bars, flexible suspending means at the front of the main frame for said cutting bars, and resilient supports for said cutting bars connected at the rear of the main frame.

2. In an implement as described the combination with a pair of rigid draw bars and a pair of cutting bars alined therewith in parallelism, a pair of suspending bars, flexible bolt connections between said suspending bars and draw bars, and resilient supporting means pivoted to said cutting bars having rigid rear end supports.

3. In an implement as described the combination with a pair of rigid draw bars and a pair of cutting bars, of a pair of suspending bars, flexible bolt connections between said suspending bars and draw bars, a pair of adjustable rock shafts and operating means therefor, and resilient lever arms having a fixed connection with said shafts and pivotally connected to said cutting bars.

In testimony whereof I affix my signature.

PETER J. RASMUSSEN.